US009027942B2

(12) United States Patent
Hasegawa

(10) Patent No.: US 9,027,942 B2
(45) Date of Patent: May 12, 2015

(54) HEAVY DUTY CARRIAGE CART

(71) Applicant: Mitsuo Hasegawa, Kitakatsuragi-gun (JP)

(72) Inventor: Mitsuo Hasegawa, Kitakatsuragi-gun (JP)

( * ) Notice: Subject to any disclaimer, the term of this patent is extended or adjusted under 35 U.S.C. 154(b) by 1 day.

(21) Appl. No.: 14/355,822

(22) PCT Filed: Feb. 25, 2013

(86) PCT No.: PCT/JP2013/054678
§ 371 (c)(1),
(2) Date: May 1, 2014

(87) PCT Pub. No.: WO2014/010264
PCT Pub. Date: Jan. 16, 2014

(65) Prior Publication Data
US 2014/0290001 A1 Oct. 2, 2014

(30) Foreign Application Priority Data
Jul. 12, 2012 (JP) .................. 2012-156837

(51) Int. Cl.
*B62B 5/00* (2006.01)
*B60B 33/00* (2006.01)
*B62B 3/00* (2006.01)

(52) U.S. Cl.
CPC .......... *B60B 33/0044* (2013.01); *Y10T 16/184* (2015.01); *B62B 5/0086* (2013.01); *B62B 3/008* (2013.01); *B62B 2203/04* (2013.01)

(58) Field of Classification Search
CPC .. B62B 5/0083; B62B 5/0086; B62B 5/0089; B62B 5/0093; B62B 3/00; B62B 3/008; B62B 3/04; B62B 3/10; B62B 2202/10; B62B 2202/30; B62B 2203/07

USPC ..................... 280/79.11, 35, 62, 63
See application file for complete search history.

(56) References Cited

U.S. PATENT DOCUMENTS

| 171,367 | A | * | 12/1875 | Estes | .......................... 280/79.11 |
| 3,411,802 | A | * | 11/1968 | Diller | .......................... 280/79.11 |

(Continued)

FOREIGN PATENT DOCUMENTS

| JP | 48029551 U | 4/1973 |
| JP | 62121162 U | 7/1987 |
| JP | 239960 U | 3/1990 |
| JP | 3051835 U | 6/1998 |

(Continued)

OTHER PUBLICATIONS

Japanese Patent Office, Notice of Reasons for Refusal of Japanese Patent Application No. 2012-156837, Nov. 20, 2012, 5 pages.

(Continued)

*Primary Examiner* — Katy M Ebner
(74) *Attorney, Agent, or Firm* — Alleman Hall McCoy Russell & Tuttle LLP

(57) ABSTRACT

A heavy duty carriage cart is provided, which is used when moving a heavy object. The heavy object can safely be moved without being influenced by factors which obstruct the traveling of the carriage cart, such as distortions or joints of flooring material on a floor surface. In a lower part of a carriage cart main body, front rollers are pivotally supported by a front shaft, rear rollers are pivotally supported by a rear shaft, and intermediate rollers are pivotally supported by an intermediate shaft at a wheel base of the rollers. A load receiving platform, having a planar portion which is freely movable while contacting with the bottom of the heavy object, is placed on an upper part of the carriage cart main body. Four heavy duty carriage carts are used to move the heavy object.

3 Claims, 12 Drawing Sheets

(56) References Cited

U.S. PATENT DOCUMENTS

| | | | | |
|---|---|---|---|---|
| 3,948,538 | A * | 4/1976 | Hovila | 280/43.23 |
| 6,481,521 | B2 * | 11/2002 | Sugiyama et al. | 180/168 |
| 7,140,622 | B1 * | 11/2006 | Cantu | 280/79.11 |
| 7,226,264 | B2 * | 6/2007 | Eggleston et al. | 414/334 |
| 7,600,767 | B2 * | 10/2009 | Lewis | 280/79.7 |
| 8,302,934 | B1 * | 11/2012 | Woods | 254/2 R |
| 8,616,564 | B2 * | 12/2013 | Takehara et al. | 280/79.11 |

FOREIGN PATENT DOCUMENTS

| | | |
|---|---|---|
| JP | 11152764 A | 6/1999 |
| JP | 2002211720 A | 7/2002 |
| JP | 2010143419 A | 7/2010 |

OTHER PUBLICATIONS

Japanese Patent Office, International Search Report of PCT/JP2013/054678, WIPO, May 14, 2013, 2 pages.

* cited by examiner

TRAVELING DIRECTION

TRAVELING DIRECTION

TRAVELING DIRECTION →

TRAVELING DIRECTION →

HEAVY DUTY CARRIAGE CART

TECHNICAL FIELD

The present invention relates to a heavy duty carriage cart used for safely moving a heavy object, such as a piece of furniture such as a wardrobe or a cabinet, or a refrigerator or a flowerpot, used in ordinary houses or offices.

BACKGROUND ART

FIGS. 10, 11 and 12 show a conventional carriage cart. This conventional art is similar to those disclosed in, for example, Patent Document 1 and Patent Document 2. The carriage carts have a structure provided with a turntable 3 which is pivotally supported on a main body 2 of the carriage cart so as to be horizontally turnable, or horizontally turnable and vertically extendable, and a tab 21 projecting forward from a front frame. The carriage carts have a plurality of rollers 5 pivotally supported at the bottom thereof. At least four carriage carts are used to support a heavy object, such as a piece of furniture, by inserting the carriage carts into four corners underneath the heavy object. The carriage carts can integrally move with the heavy object by the load acting from the heavy object.

REFERENCE DOCUMENTS OF CONVENTIONAL ART

Patent Documents

Patent Document 1: JP3051835U
Patent Document 2: JP2010-143419A

DISCLOSURE OF THE INVENTION

Problems to be Solved by the Invention

As shown in FIG. 9, the above-described carriage carts integrally move with a heavy object 10, such as a piece of furniture, by the load acting from the heavy object 10, while supporting the heavy object 10 after the carriage carts are inserted into the four corners underneath the heavy object 10. However, if there are slight distortions or vertical gaps on a floor surface where heavy duty carriage carts 1a, 1b, 1c and 1d travel, the integrated state of one or some of the carriage carts with the heavy object 10 is canceled. Thus, the heavy duty carriage carts 1a, 1b, 1c and 1d which were inserted into the four corners of the heavy object 10 may be reduced down only to three carriage carts at three corners, or rarely down to the support by two carriage carts, resulting in some of carriage carts being left behind. FIG. 13(b) shows this left-behind state, i.e., a state where the heavy object is floating. Alternatively, as shown in FIG. 13(a), when the load acting from the heavy object 10 to the carriage cart at the edge of a slope of the floor surface shifts greatly in the rear-to-front direction, or to the right or to the left, the carriage carts loose their straight-traveling capability because the load concentrates on one or some of the rollers. Thus, the carriage cart may unintentionally change its course, and some carriage carts may deviate their courses from a moving direction of the heavy object 10, resulting in the traveling being stopped.

Moreover, as shown in FIG. 12, one of the conventional carriage carts has the structure where the turntable 3 is provided on the main body 2 so as to be pivotally supported horizontally turnable and vertically extendable, and the carriage cart is configured as if it can smoothly move by extending and retracting the turntable 3 even if the carriage cart travels on the floor surface having the distortion or the inclination of the vertical gap. However, the extension and the retraction of the turntable 3 are to simply move the turntable 3 in vertical directions. Thus, as shown in FIGS. 14(a) and 14(b), and FIGS. 15(a) and 15(b), when the carriage cart approaches a distortion or an inclined part E on the floor surface, or the middle of the slope, a load point W of the heavy object 10 acting to the turntable 3 moves to the peripheral portion of the turntable 3, and the turntable 3 which only movable vertically will not extend from the carriage cart main body 2. Therefore, the load cannot be received near the center of the turntable 3. In addition, since the extending force which the turntable 3 always exerts a force to extend the entire turntable upwardly, a no-load point N where the load of the turntable 3 is not acted operates the turntable 3 to extend from the carriage cart main body 2. Therefore, the turntable 3 will operates to extend upwardly in a slanted manner with respect to the carriage cart main body 2. This creates a distortion in the fitting between the turntable 3 and a recessed portion 22 or a center boss hole portion 26 of the carriage cart main body 2, resulting in a generation of large friction between the turntable 3 and the carriage cart main body 2. Therefore, the smooth extension cannot be expected.

Note that, as shown in FIGS. 11 and 12, the conventional carriage carts are characterized by arranging the positions of the rollers 5 which are pivotally supported in the lower part of the carriage cart main body to be located outside the peripheral portion of the turntable 3 to prevent a tip-over of the carriage cart even if the position of the load acting to the turntable 3 is shifted. This means that there is no roller 5 in the lower part of the turntable 3, which supports the load by contacting with the floor surface, and the load acting from the heavy object 10 is supported by the rollers 5 arranged only outside the turntable 3. This will not cause a problem when traveling on a flat floor surface, but, as shown in FIGS. 14(a) and 14(b), and FIGS. 15(a) and 15(b), when the carriage cart approaches the distortion or inclined part E on the floor surface and keeps traveling, or approaches the middle of the slope, the point W of the load acting from the heavy object 10 moves to the peripheral portion of the turntable 3, and the load acting from the heavy object 10 will remarkably concentrate only on the roller(s) 5 near the load point W. For this reason, the carriage cart which approaches the distortion or the vertical gap on the floor surface greatly looses the balance of the loads acted onto the rollers 5 of front, rear, left and right. Therefore, friction or resistance which is caused between the roller and the floor surface, and the roller and the roller shaft thereof, is greatly different between the roller(s) which receives a less load and the roller(s) which receives a larger load. This causes deterioration of the straight-traveling capability of the carriage carts and, thus, the carriage carts unintentionally change their course in the middle of traveling, and the positions of the carriage carts with respect to the heavy object are shifted, or the carriage carts are disengaged from the heavy object. Therefore, the smooth movement of the heavy object is obstructed. Particularly, considering when the distortion on the floor surface is an uphill as shown in FIG. 14(b), or when there is a slight going-up step H on the floor surface forward in the course as shown in FIG. 16, the carriage cart travels over the going-up step H, and the load acting from the heavy object 10 is then substantially entirely acted onto the rollers 5 pivotally supported by a front shaft 6a of the carriage cart as a load Wa. In order for the carriage cart to travel over the going-up step H to keep traveling forward, a large force P occurs as resistance to obstruct the traveling of the carriage cart. Thus, the contacting between the heavy object 10 and the turntable 3 is released, and the traveling of the carriage cart is greatly obstructed. A floor surface F where a piece of furniture or the like is moved has the distortion or the vertical gap even if the floor is made of tiles or flooring material, as well as tatami mats or a concrete floor. Some carriage carts have more risks of the unintentional stop or the course change, which results in a sudden difficulty in traveling the carriage carts. The piece of furniture or the like may then fall off the carriage cart(s). Thus, this may induce an injury of an operator or damages to the floor surface. Therefore, the floor surface to which the carriage carts are applicable is only limited to an entirely flat surface.

Therefore, the object according to the present invention is to provide a heavy duty carriage cart, which is movable smoothly, stability and safely on a floor surface which has been widely spread in ordinary houses using a wide range of floor materials, such as tatami mats, wooden flooring, tiles and stone floor, having distortions, curves, etc.

SUMMARY OF THE INVENTION

A heavy duty carriage cart 1 according to the present invention which is made in order to solve the above objectives includes a carriage cart main body 2, a plurality of rollers 5 pivotally supported by a plurality of shafts at a lower part of the carriage cart main body 2, and a load receiving platform 3 placed on an upper part of the carriage cart main body 2, the load receiving platform 3 including a planar portion 4 configured to support a heavy object by contacting with the bottom of the heavy object, and an elastic member arranged in a tapered shape, outside the perimeter of the planar portion such that the planar portion freely changes an inclining angle thereof to be adjustable of extension and retraction of the planar portion.

The load receiving platform 3 has the planar portion 4 to contact the bottom of the heavy object 10 at the center thereof. The tapered portion may be formed in the elastic member from a peripheral edge 3b of the planar portion to a peripheral edge 3a of the load receiving platform, and the tapered portion of the elastic member may be formed such that its elasticity becomes smaller gradually from the center portion toward the peripheral portion. The peripheral edge 3a of the load receiving platform may be in contact with a receiving portion 22 of the carriage cart main body. Thus, the planar portion 4 of the load receiving platform 3 is freely changeable in the inclining angle with respect to the carriage cart main body 2, and the planar portion 4 is always in contact with the bottom of the heavy object 10 to hold the load acting from the heavy object 10. The load receiving platform 3 which received the load acting from the heavy object 10 at the planar portion 4 begins deforming from the peripheral portion with an increase in the load, and the deformation sequentially advances to the center portion. The load receiving platform 3 is placed on the upper part of the carriage cart main body 2 such that, when a load more than a predetermined load is acted while the bottom of the heavy object 10 is always in contact with the planar portion 4 of the load receiving platform 3, the load receiving platform 3 closely contacts the carriage cart main body 2.

The lower part of the carriage cart main body 2 may be provided with a front shaft 6a configured to pivotally support front rollers 5, a rear shaft 6c configured to pivotally support rear rollers 5, and an intermediate shaft 6b configured to pivotally support intermediate rollers 5 at a wheel base of the rollers. The intermediate shaft 6b may be located below a center position of the planar portion 4. Thus, the load acting from the heavy object 10 can be distributed and supported by the front and rear shaft rollers 5 centering on the intermediate rollers 5.

Therefore, as shown in FIG. 9, when the heavy duty carriage carts 1a, 1b, 1c and 1d were inserted into the bottom of the heavy object 10, such as a piece of furniture, and moved the heavy object 10, in a case of a flat floor surface, the bottom of the heavy object 10 was parallel to the floor surface, and the heavy duty carriage carts 1 securely held the heavy object on the floor surface as shown in FIG. 5(a). When some of the heavy duty carriage carts 1 approached the distortion or the dent on the floor surface, and as shown in FIG. 5(b), and FIGS. 6(a) and 6(b), the inclination occurred between the floor surface and the bottom of the heavy object 10. However, even if the state where the position of the load acting from the heavy object shifts greatly from the center of the heavy duty carriage cart is occurred, or, as shown in FIGS. 5(c) and 6(c), even if the heavy duty carriage carts according to the present invention encounter the possibility where the distance between the bottom of the heavy object 10 and the floor surface increases, and the load acting from the heavy object 10 no longer acts onto the heavy duty carriage carts 1, the planar portion 4 of the load receiving platform 3 of the heavy duty carriage cart 1 extends and/or extracts while freely changing the inclining angle so that the planar portion 4 keeps contacting with the bottom of the heavy object 10 without separating therefrom. Therefore, the heavy duty carriage cart 1 according to the invention can always hold the load of the heavy object 10 at the planar portion 4 of the load receiving platform 3. Therefore, as shown in FIG. 9, when moving the heavy object 10, such as a piece of furniture, even if some of the heavy duty carriage carts 1a, 1b, 1c and 1d encounter the distortion or the dent on the floor surface, the heavy duty carriage cart 1 according to the present invention can stably support the heavy object, while keeping itself in contact with the bottom of the heavy object 10 and the floor surface without separating therefrom, and always receiving the load at the planar portion 4 of the load receiving platform 3.

Further, when the heavy duty carriage cart 1 according to the present invention encounters a gap G at the joint between the plates if the floor surface F where the heavy object 10 is moved is made of a flooring material, or encounters the gap G at the joint between tiles or stone plates. Then, the possibility that any of the front, rear and intermediate rollers 5 falls into the gap G may be occurred. As shown in FIG. 7(a), when the rollers 5 pivotally supported by the front shaft 6a approach the gap G and the possibility of the rollers 5 falling into the gap G is occurred, the heavy duty carriage cart 1 is about to incline forward. However, a point W of the load acting to the load receiving platform 3 naturally moves rearward slightly from the center portion of the loading platform, and the load acting from the heavy object is then held by the rollers 5 pivotally supported by the intermediate shaft 6b and the rear shaft 6c. Therefore, the rollers 5 pivotally supported by the front shaft 6a will not fall into the gap G. Further, as shown in FIG. 7(b), if the rollers 5 pivotally supported by the intermediate shaft 6b are located at the gap G, the load acting to the load receiving platform 3 is held by the rollers 5 pivotally supported by the front shaft 6a and the rear shaft 6c, and the rollers 5 will not fall into the gap G. Further, as shown in FIG. 7(c), also if the rollers 5 pivotally supported by the rear shaft 6c are located at the gap G, the point W of the load acting to the load receiving platform 3 naturally moves forward slightly from the center portion of the loading platform, and the load acting from the heavy object is then held by the rollers 5 pivotally supported by the intermediate shaft 6b and the front shaft 6a. Therefore, the rollers 5 pivotally supported by the rear shaft 6c will not fall into the gap G, and the heavy duty carriage cart 1 can move smoothly.

Note that, as shown in FIG. 8(a), when the heavy duty carriage cart 1 according to the present invention encounters a going-up step H on the floor surface in the course thereof, the rollers 5 pivotally supported by the intermediate shaft 6b hold substantially a half load Wb of the load W acting from the heavy object 10. Therefore, a load Wa acting to the front shaft rollers 5 which encountered the step H further decreases, and a resistance P which is received when traveling the heavy duty carriage cart 1 over the going-up step H to move forward becomes small. Further, the carriage cart main body 2 made of resin has elasticity, and the resistance which is received at the front shaft rollers 5 is also absorbed by the carriage cart main body 2 slightly deforming in a bow bending manner backwardly centering on the intermediate shaft 6b portion. Thus, since a loading ratio to the front shaft rollers 5 further decreases, the front shaft rollers 5 do not easily receive the resistance of the going-up step H on the floor surface forward, and the possibility that the heavy duty carriage cart 1 stops at the step H and is removed from the heavy object 10 can be eliminated. Therefore, even if the heavy duty carriage cart 1 according to the present invention encounters the obstacle, such as the joint or the inclination of the distortion, or a loose dent on the floor surface where the carriage cart travels and moves, the possibility that the heavy duty carriage cart 1 is left behind from the heavy object 10, and the risks including an unintentional change in the course of the carriage cart, can be avoided. Thus, the heavy object, such as a piece of furniture, can be moved smoothly and safely.

Effects of the Invention

As described above in detail, when the heavy duty carriage carts 1 according to the present invention are inserted at the four corners underneath the heavy object 10, such as a piece of furniture, and the carriage carts are then moved while supporting the heavy object 10, even if the carriage carts encounter the obstacle, such as the inclination of the distortion or the loose dent on the floor surface where the carriage carts travels and moves, the heavy duty carriage carts 1 can stably travel, always in contact with the bottom of the heavy object 10 and the floor surface, without separating therefrom. Therefore, the heavy object 10, such as a piece of furniture, can be carried safely, smoothly and easily, in accordance with most flooring materials used in ordinary houses or offices. Further, since the load receiving platform 3 is formed in the tapered shape toward the center of the upper surface of the carriage cart main body 1, the carriage cart has an effect that it can be inserted smoothly without resistance when being inserted into the bottom of the heavy object 10. Note that, by pivotally supporting the rollers 5 by the three shafts 6a, 6b and 6c, the rollers 5 will not fall into the gap at the joint of the floor surface where the carriage cart travels and moves and, thus, the traveling of the heavy duty carriage cart 1 will not be stopped. Further, even if there is the uphill or the going-up step on the floor surface forward of the travel of the carriage cart, the front shaft rollers 5 has an effect to not easily receive the resistance of the step on the floor surface forward. Therefore, the stable traveling can be achieved also with smaller-diameter rollers. As described above, since, with the number of the roller shafts is less and three, the effects of the prevention of the roller falling into the gap at the joint of the floor surface and the reduction in the roller outer diameter can be acquired, the heavy duty carriage cart which is small in size, better in traveling performance, and low in height can be provided. This brings great effects in terms of an improvement in operability and safety because the heavy object, such as a piece of furniture, is only raised slightly when inserting the heavy duty carriage cart into the bottom of the heavy object, such as a piece of furniture.

MODES FOR CARRYING OUT THE INVENTION

[Embodiment]

Figure 1:
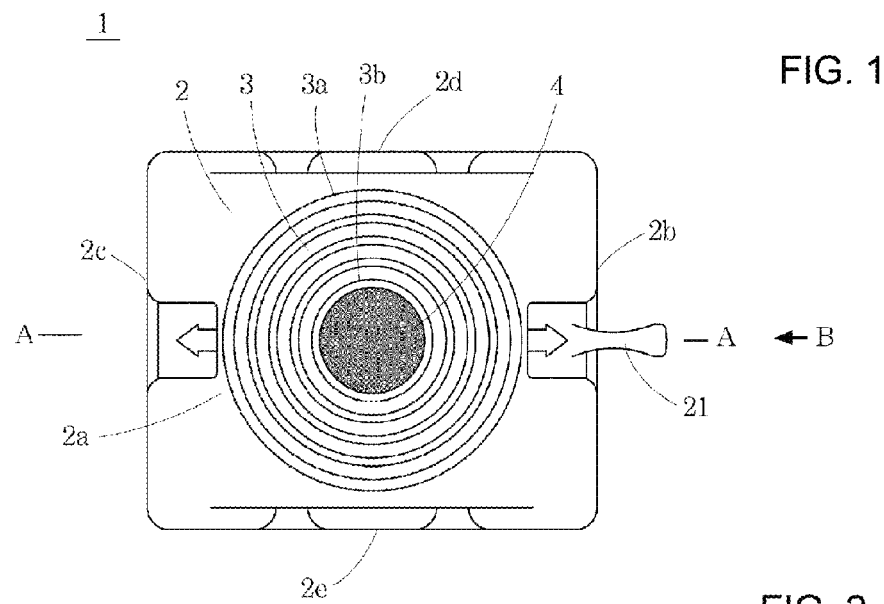
FIG. 1 is a plan view showing a first embodiment according to the present invention.

FIGS. 1 to 4 show one embodiment of a heavy duty carriage cart 1 according to the present invention. This heavy duty carriage cart 1 is comprised of a carriage cart main body 2 made of synthetic resin, rollers 5 made of synthetic resin, roller shafts 6a, 6b and 6c made of metal, and a load receiving platform 3 provided to an upper part of the carriage cart main body 2.

Figure 3:
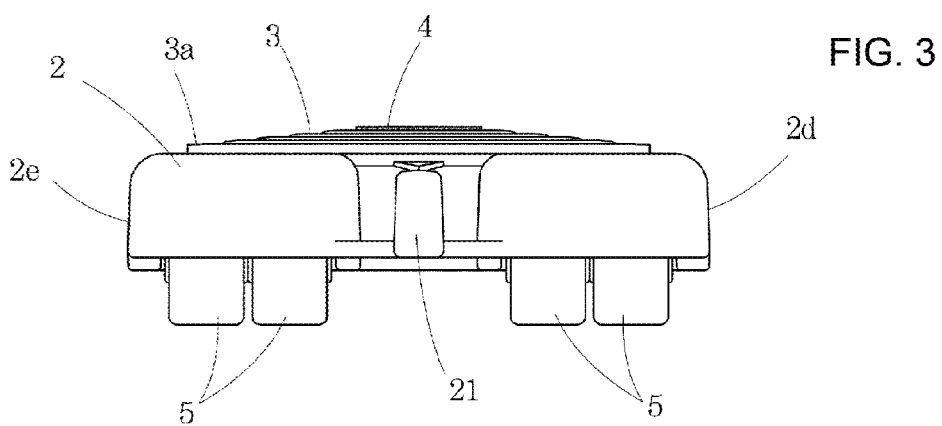
FIG. 3 is an elevational view of FIG. 1, seen in an arrow direction B.
Figure 4:
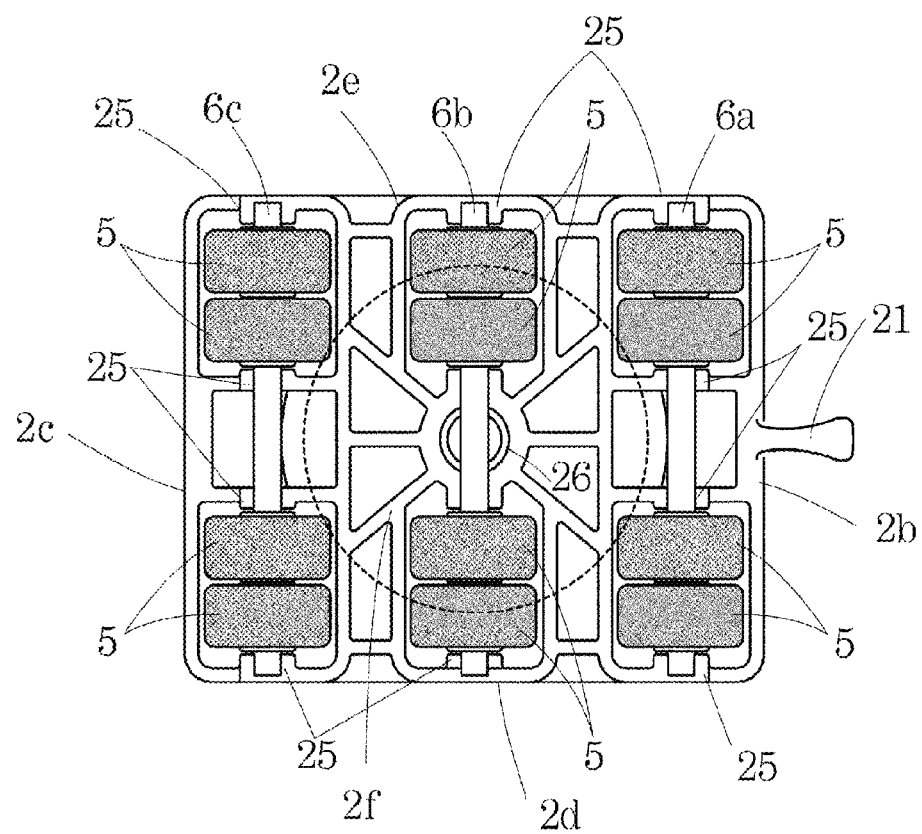
FIG. 4 is a bottom view of FIG. 1.

As shown in FIGS. 3 and 4, the carriage cart main body 2 includes a curved external surface which extends from a top plate 2a to front, rear, left and right side faces 2b, 2c, 2d and 2e, and covers substantially halves of the rollers. The carriage cart main body 2 also includes ribs 2f on a lower surface of the top plate 2a, and a boss hole 26 is formed, which penetrates vertically in a center portion of the main body 2. A recessed seat 22 for holding the load receiving platform 3 is formed on an upper surface of the top plate 2a, and a lower surface of the top plate 2a is opened.

As shown in FIG. 4, the ribs 2f formed on the lower surface of the top plate 2a are integrally formed in a honeycomb shape from the boss hole 26 part at the center of the carriage cart main body 2 to the side faces 2b, 2c, 2d and 2e of front, rear, left and right. Further, bearing portions 25 which support the roller shafts 6a, 6b and 6c are formed at twelve locations in the side faces 2d and 2e of front, rear, left and right, and the rib 2f, so that the bearing portions 25 are arranged to pivotally support the rollers 5 separately at six locations.

Figure 2:
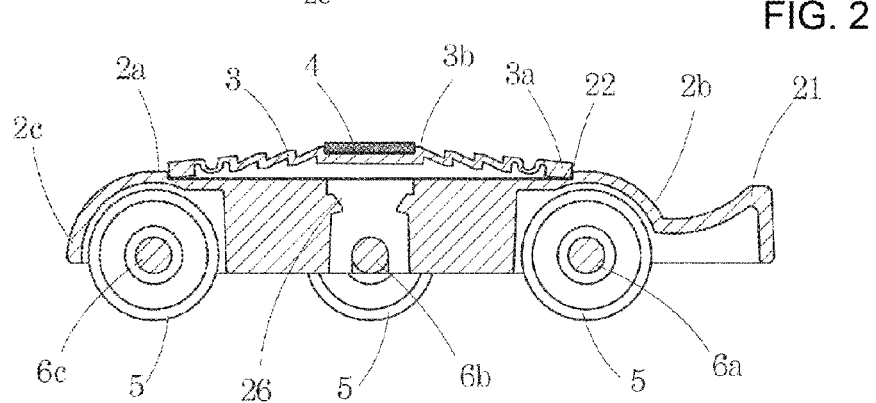
FIG. 2 is a cross-sectional view taken along a line A-A of FIG. 1.

As shown in FIG. 2, the load receiving platform 3 has a planar portion 4 in a center portion. An elastic member between a planar portion peripheral edge 3b and a load receiving platform peripheral edge 3a forms a tapered portion, and the tapered portion is formed in a ripple shape such that it has a gradually decreasing elasticity from the center portion toward the peripheral portion. The load receiving platform 3 is placed on the carriage cart main body 2 in a state where the load receiving platform peripheral edge 3a contacts the receiving portion 22 of the carriage cart main body 2. Note that, in this embodiment, a member made of urethane or the like for increasing a coefficient of friction is provided on an upper surface of the planar portion 4 of the center portion.

When the load receiving platform 3 is placed on the carriage cart main body 2, the peripheral edge 3a is supported by the carriage cart main body 2, while being in contact with the recessed seat 22 of the carriage cart main body 2. The planar portion 4 is configured to have a function of extension and retraction via the elastic member, while being freely movable to change its inclining angle with respect to the carriage cart main body 2 and, thus, the planar portion 4 moves smoothly, while contacting with the bottom of a heavy object 10.

Four rollers 5 are pivotally supported by the roller shaft 6a in a front part of the carriage cart main body 2, and four rollers 5 are pivotally supported by the roller shaft 6c in a rear part, and four rollers 5 are pivotally supported by the roller shaft 6b in a longitudinally intermediate part. Thus, the rollers 5 are arranged at six locations in the lower part of the load receiving platform 3 and in a part outside the peripheral edge 3a. Note that the intermediate shaft 6b is arranged below the center portion of the planar portion 4. If the heavy duty carriage cart is used for a light object, the number of rollers 5 may be two, respectively.

Figure 5A:
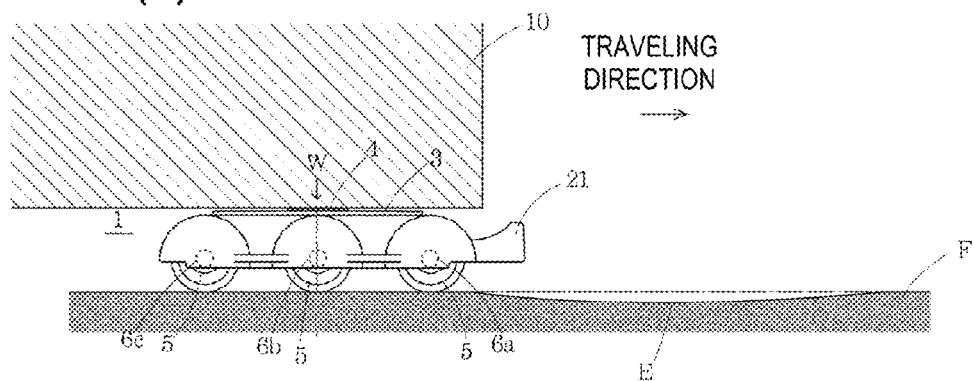
FIG. 5(a)-(c) are an illustration of effects (#1) of a heavy duty carriage cart according to the present invention.
Figure 5B:
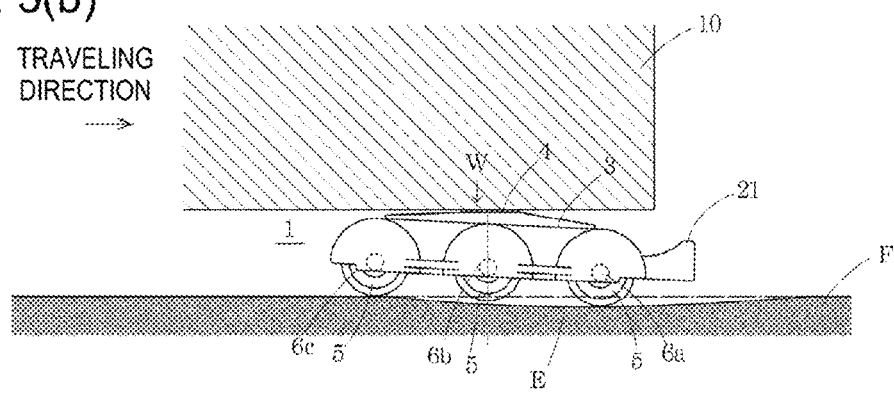
Figure 5C:
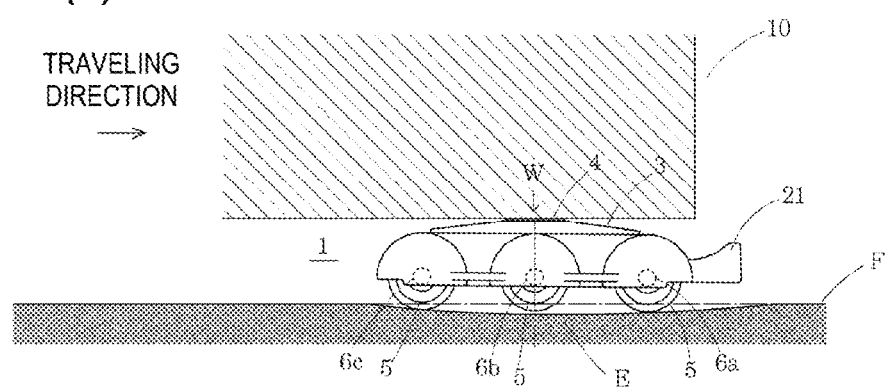
Figure 6A:
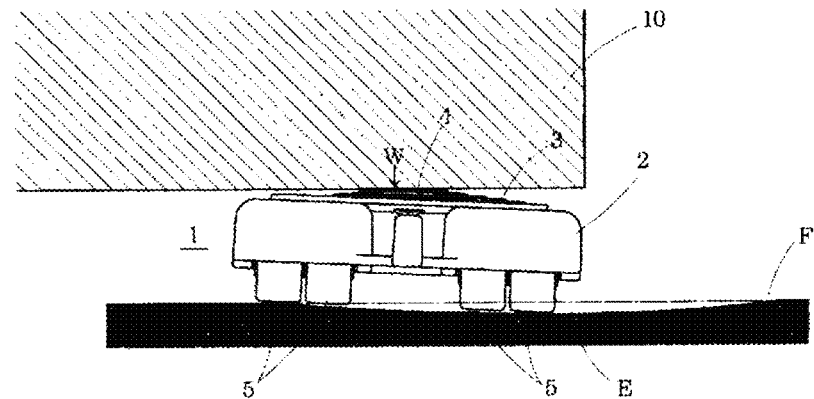
FIG. 6(a)-(c) are an illustration of effects (#2) of the heavy duty carriage cart according to the present invention.
Figure 6B:
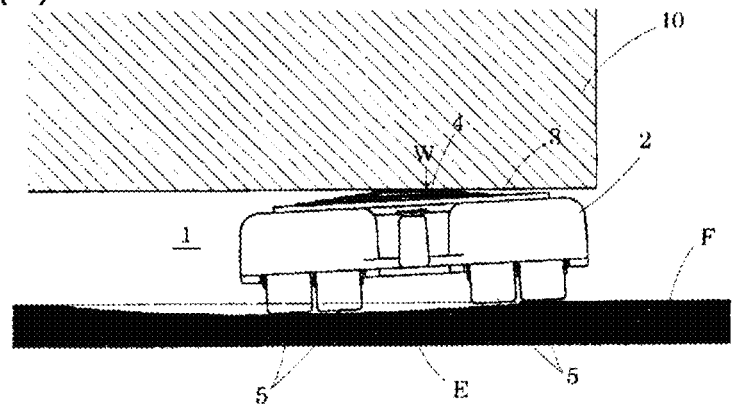
Figure 6C:
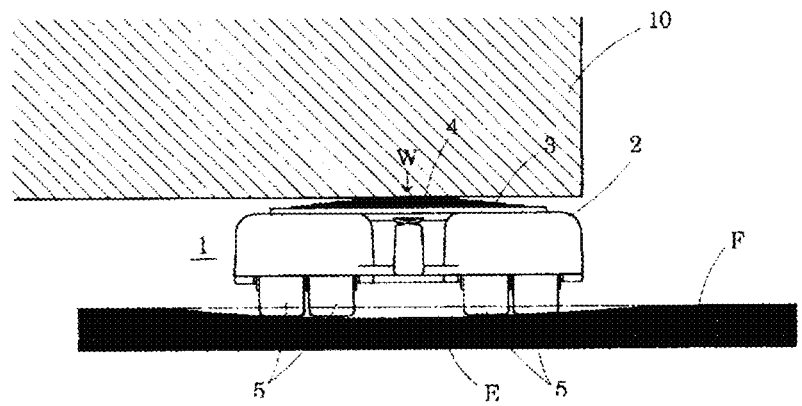
Figure 9:
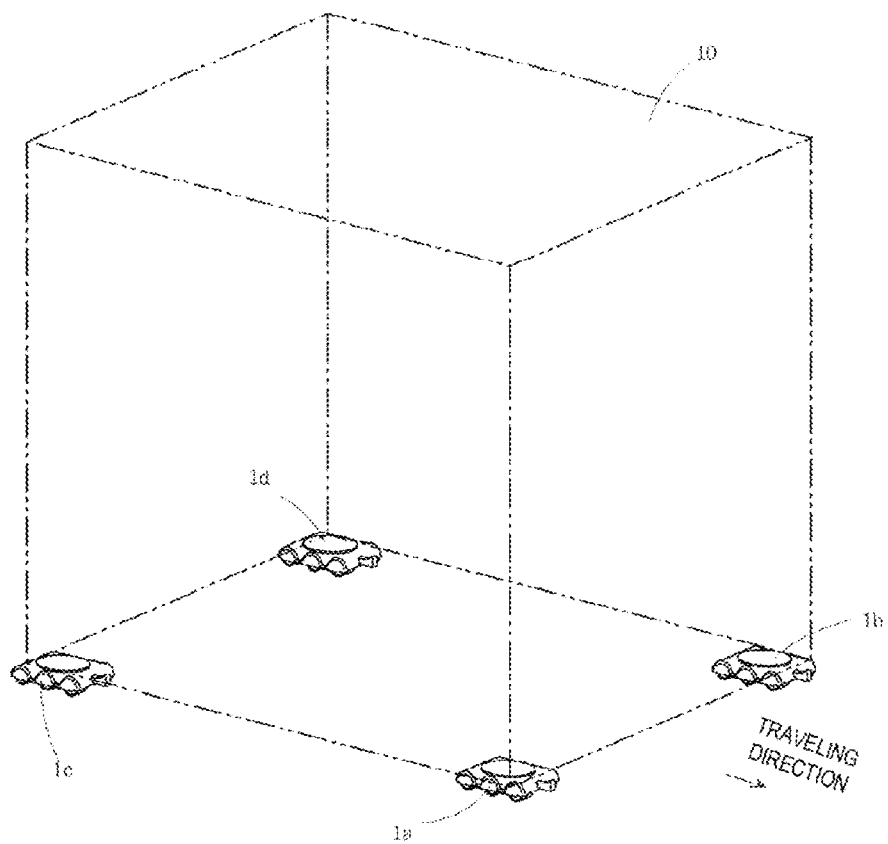
FIG. 9 is an illustration of use of the heavy duty carriage cart.
Figure 10:
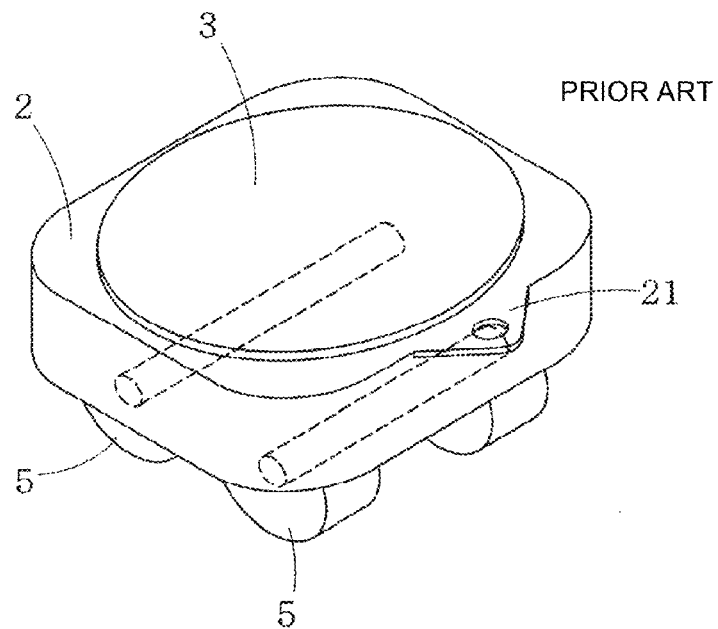
FIG. 10 is a perspective view of a conventional heavy duty carriage cart.
Figure 11:
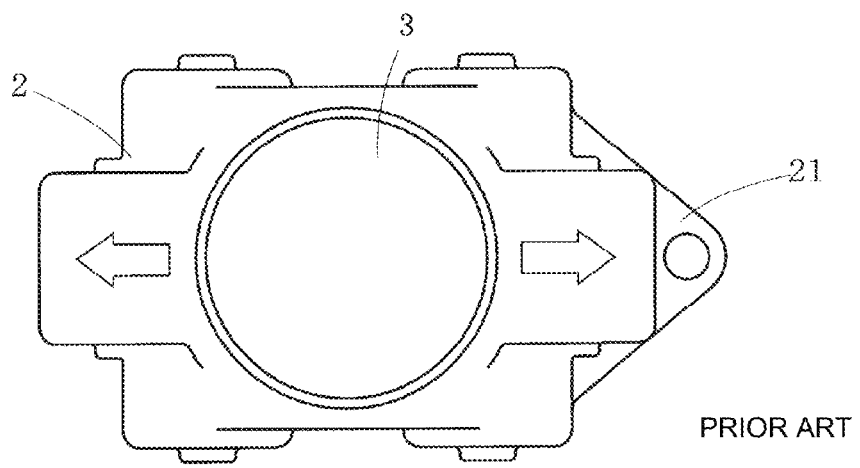
FIG. 11 is a plan view of the conventional heavy duty carriage cart.
Figure 12:
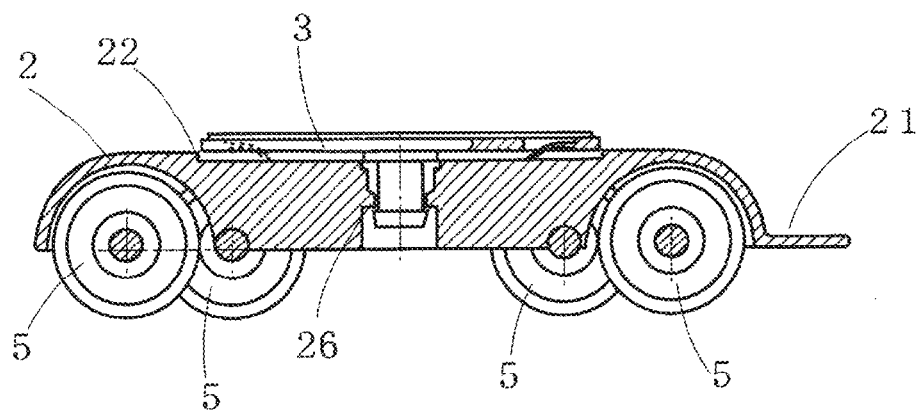
FIG. 12 is a cross-sectional view of the conventional heavy duty carriage cart.
Figure 13A:
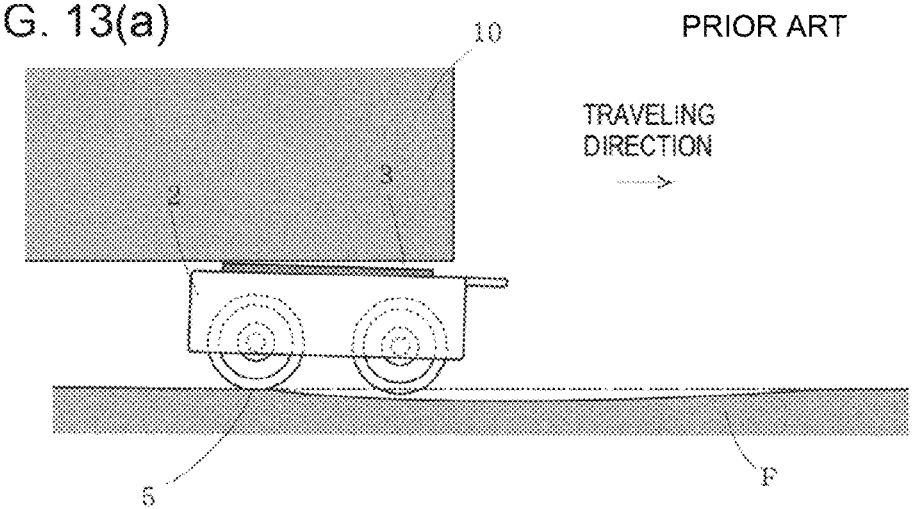
FIG. 13(a)-(b) are an illustration of problems (#1) of the conventional heavy duty carriage cart.
Figure 13B:
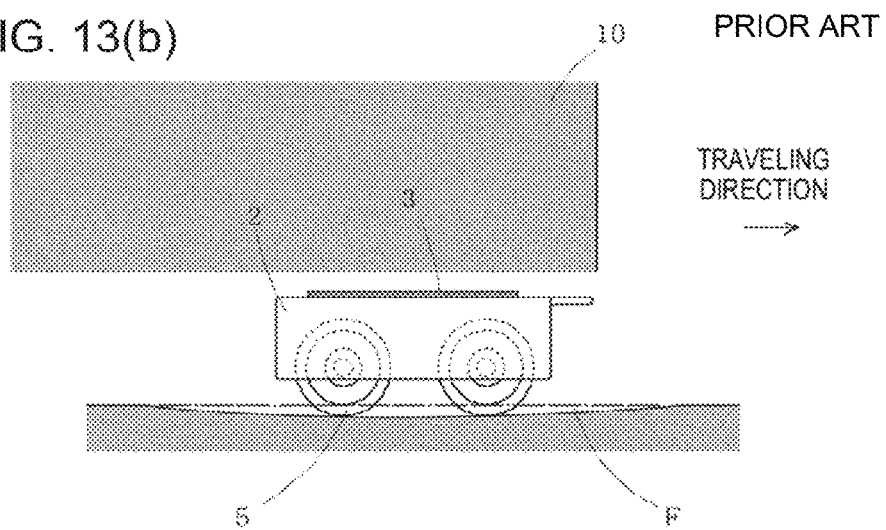
Figure 14A:
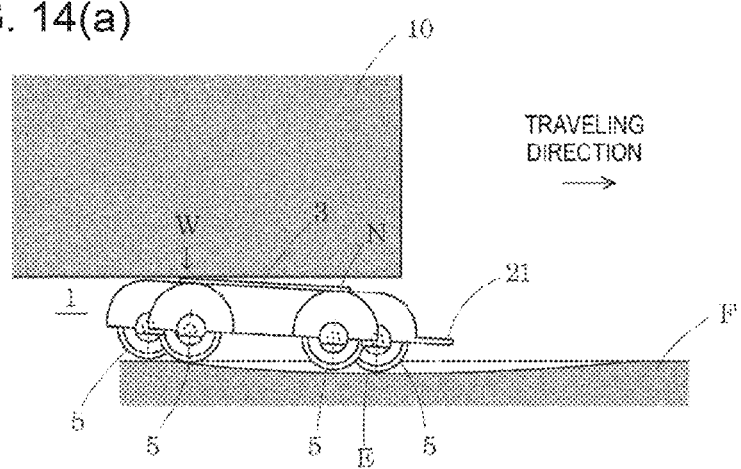
FIG. 14(a)-(b) are an illustration of problems (#2) of the conventional heavy duty carriage cart.
Figure 14B:
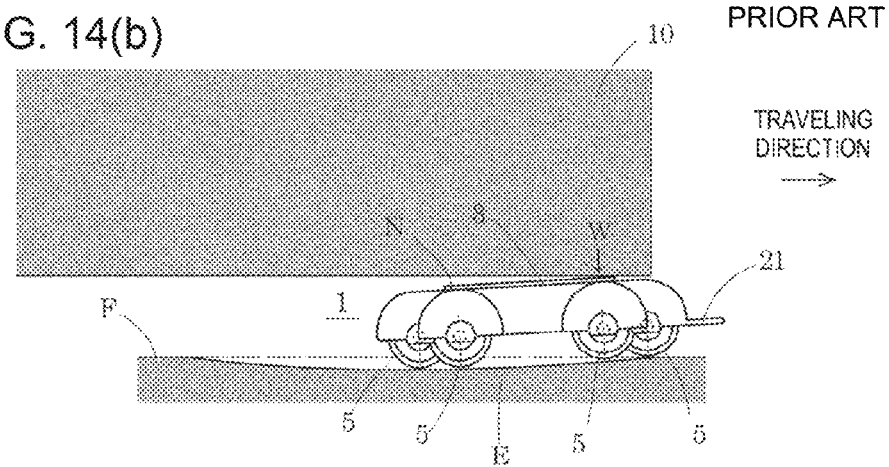
Figure 15A:
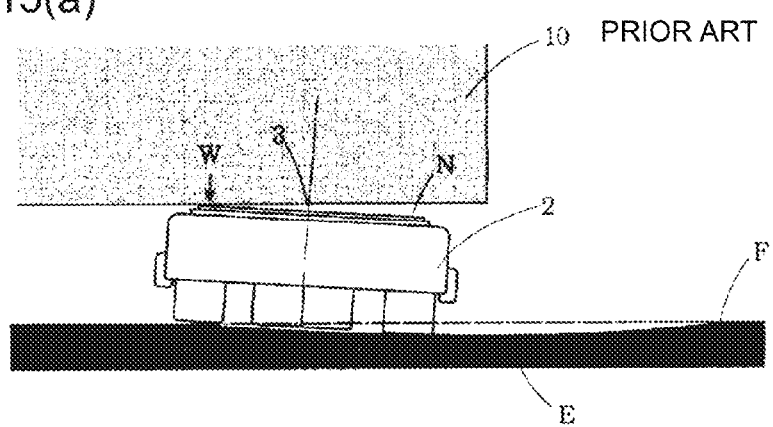
FIG. 15(a)-(b) are an illustration of problems (#3) of the conventional heavy duty carriage cart.
Figure 15B:
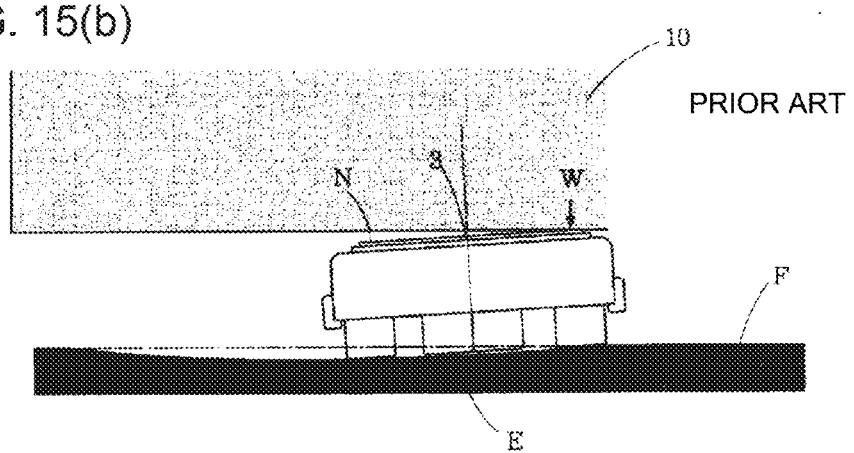
Figure 16:
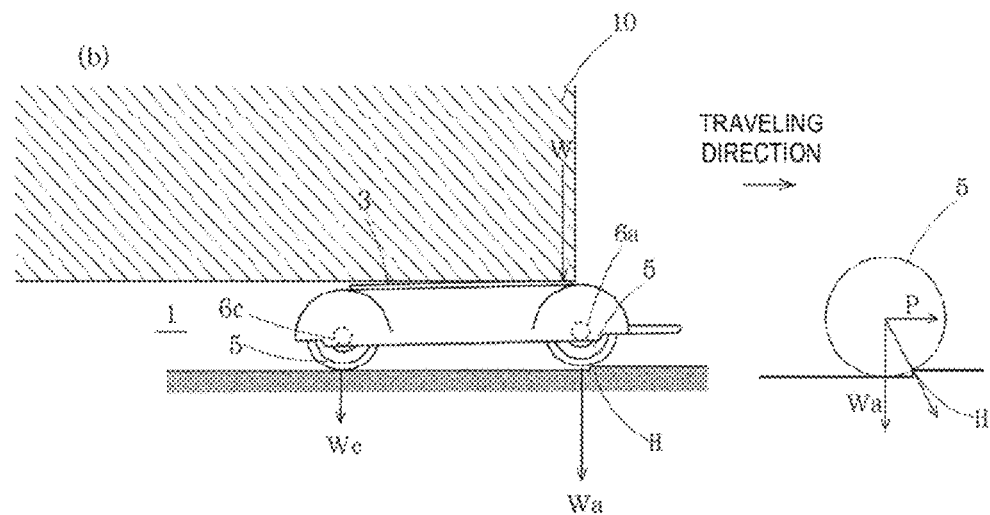
FIG. 16 is an illustration of problems (#4) of the conventional heavy duty carriage cart.

Hereinafter, operation of the heavy duty carriage cart according to the present invention is described, using FIGS. 1 to 9. As shown in FIG. 9, the heavy duty carriage carts 1a, 1b, 1c and 1d are inserted into the bottom of the heavy object 10 such as a piece of furniture, and the heavy duty carriage carts 1a, 1b, 1c and 1d move on a floor surface, while supporting the heavy object 10. In such a case, when the heavy duty carriage cart 1a approaches a distortion or a dent on the floor surface, and, as shown in FIGS. 5(b), 6(a) and 6(b), an inclination is generated between the floor surface and the bottom of the heavy object. Then, a state where a load position W of the heavy object 10 may greatly shift from the center of the heavy duty carriage cart may occur, or, as shown in FIG. 5(c) or 6(c), a distance between the bottom of the heavy object 10 and the floor surface may increase, and the load of the heavy object 10 may not act onto the heavy duty carriage cart 1a. Even in such a case, the center planar portion 4 of the load receiving platform 3 which is placed on the heavy duty carriage cart 1a extends and retracts, while changing the inclining angle so that the center planar portion 4 keeps the contacting state with the bottom of the heavy object 10 and does not separate therefrom. Thus, the load of the heavy object 10 can always be held at the center planar portion 4 of the load receiving platform 3 of the heavy duty carriage cart 1a. Therefore, the heavy duty carriage cart 1a according to the present invention keeps contacting with the bottom of the heavy object 10 and with the floor surface, without separating therefrom, and can stably support the heavy object, while always receiving the load near the center of the heavy duty carriage cart 1a. This effect can also be applied to other heavy duty carriage carts 1b, 1c and 1d.

Figure 7A:
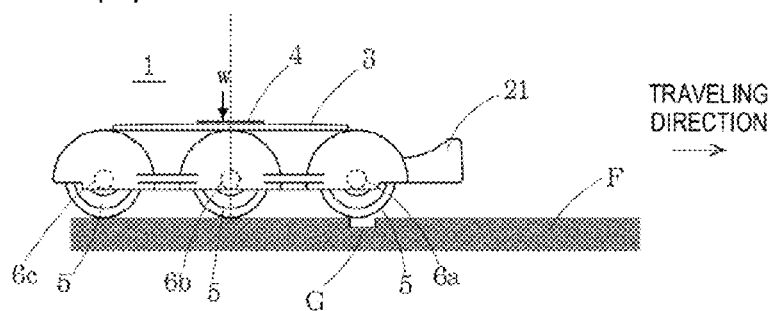
FIG. 7(a)-(c) are an illustration of effects (#3) of the heavy duty carriage cart according to the present invention.
Figure 7B:
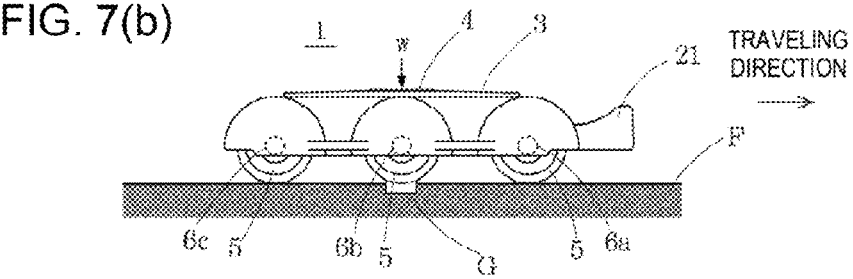
Figure 7C:
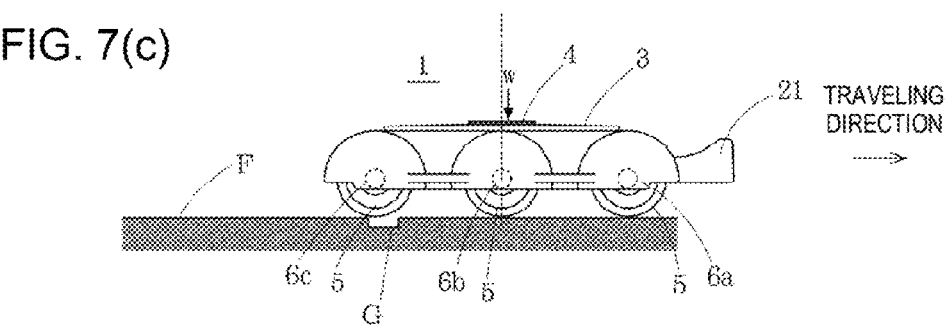
Figure 8:
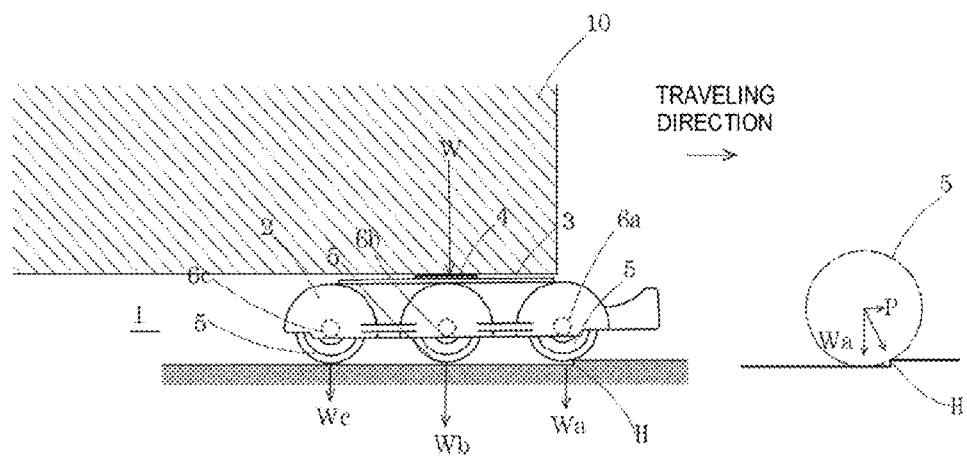
FIG. 8 is an illustration of effects (#4) of the heavy duty carriage cart according to the present invention.

Moreover, as shown in FIGS. 7(a), 7(b) and 7(c), for example, when the heavy duty carriage cart 1 according to the present invention encounters a gap G at the joint of plates if the floor surface F, where the heavy object 10 such as a piece of furniture is moved, is wooden flooring, or a gap G on the joint of tiles or stone plates if the floor surface F is tile or stone flooring, the rollers 5 pivotally supported by the front shaft 6a approach the gap G as shown in FIG. 7(a), and the rollers 5 are then about to fall into the gap G to incline the heavy duty carriage cart 1 forward. However, the load point W acting to the load receiving platform 3 naturally moves slightly rearward from the center portion of the loading platform, and the load acting from the heavy object 10 is held by the rollers 5 which are pivotally supported by the intermediate shaft 6b and the rear shaft 6c. Therefore, the rollers 5 which are pivotally supported by the front shaft 6a will not fall into the gap G. Further, when the rollers 5 pivotally supported by the intermediate shaft 6b are located at the gap G as shown in FIG. 7(b), the load acting to the load receiving platform 3 is held by the rollers 5 pivotally supported by the front shaft 6a and the rear shaft 6c, and the rollers 5 will not fall into the gap G. Further, also when the rollers 5 pivotally supported by the rear shaft 6c are located at the gap G as shown in FIG. 7(c), the point W of the load acting to the load receiving platform 3 naturally moves slightly forward from the center portion of the loading platform, and the load acting from the heavy object 10 is held by the rollers 5 pivotally supported by the intermediate shaft 6b and the front shaft 6a. Therefore, the rollers 5 pivotally supported by the rear shaft 6c will not fall into the gap G and, thus, the heavy duty carriage cart 1 can move smoothly.

Note that, as shown in FIG. 8(a), when the heavy duty carriage cart 1 according to the present invention encounters a going-up step H on the floor surface on its course, since the rollers 5 pivotally supported by the intermediate shaft 6b hold substantially a half load Wb of the load W acting from the heavy object 10, a load Wa acting to the front shaft rollers 5 which encounter the step H further decreases, a resistance P which is received when the heavy duty carriage cart 1 travels forward and travels over the going-up step H becomes only a little. In addition, since the carriage cart main body 2 made of resin has elasticity, the resistance which is received by the front shaft rollers 5 is also absorbed by the carriage cart main body 2 slightly deforming in a bow bending manner backward at the intermediate shaft 6b portion as the center, and since the loading ratio to the front shaft rollers 5 further decreases, the front shaft rollers 5 will be more difficult to receive the resistance at the going-up step H on the floor surface forward. As described above, the heavy duty carriage cart 1 according to the present invention is dramatically improved in the traveling performance thereof over the distortions and roughness, and the steps on the floor surface, and even if smaller-diameter rollers compared with those of the conventional carriage carts are adopted, the traveling performance will not be degraded. Therefore, the heavy duty carriage cart, which is significantly smaller and lower than the conventional carriage carts, can be provided.

DESCRIPTION OF REFERENCE NUMERALS

1: Heavy Duty Carriage Cart
2: Carriage Cart Main Body
3: Load Receiving Platform
3a: Load Receiving Platform Peripheral Edge
3b: Load Receiving Platform Center Planar Portion Peripheral Edge
4: Load Receiving Platform Center Planar Portion

5: Roller
6*a*: Roller Shaft
6*b*: Roller Shaft
6*c*: Roller Shaft
10: Heavy Object

The invention claimed is:

1. A heavy duty carriage cart, comprising:
a carriage cart main body;
a plurality of rollers pivotally supported by a plurality of shafts at a lower part of the carriage cart main body; and
a load receiving platform placed on an upper part of the carriage cart main body, the load receiving platform including:
  a planar portion configured to support a heavy object by contacting with a bottom of the heavy object; and
  an elastic member arranged in a tapered shape outside a perimeter of the planar portion and extending from a peripheral edge of the planar portion toward a peripheral edge of the load receiving platform, such that extension and retraction of the planar portion can be adjusted while changing an inclining angle of the planar portion.

2. The heavy duty carriage cart of claim 1, wherein the elastic member has a tapered portion from the peripheral edge of the planar portion toward the peripheral edge of the load receiving platform, the tapered portion being formed so as to have a gradually smaller elasticity from a center portion toward a peripheral portion thereof, and
wherein the load receiving platform is placed on the carriage cart main body so that the peripheral edge of the load receiving platform contacts a receiving portion of the carriage cart main body.

3. The heavy duty carriage cart of claim 2, wherein the lower part of the carriage cart main body is provided with a front shaft configured to pivotally support front rollers, a rear shaft configured to pivotally support rear rollers, and an intermediate shaft configured to pivotally support intermediate rollers at a wheel base of the rollers, and the intermediate shaft is located below a center position of the planar portion.

\* \* \* \* \*